United States Patent [19]
Kwon

[11] Patent Number: 5,445,337
[45] Date of Patent: Aug. 29, 1995

[54] TAPE RECORDER HAVING INTEGRAL TENSION POLE AND IMPEDANCE ROLLER

[75] Inventor: Seog Ha Kwon, Seoul, Rep. of Korea

[73] Assignee: Samsung Electronics Co., Ltd., Kyungki-do, Rep. of Korea

[21] Appl. No.: 172,075

[22] Filed: Dec. 23, 1993

[30] Foreign Application Priority Data

Feb. 26, 1993 [KR] Rep. of Korea ............... 1993-2745

[51] Int. Cl.$^6$ .............................. B65H 23/16
[52] U.S. Cl. .................... 242/334.6; 242/419.8; 242/421.8; 360/85; 360/83
[58] Field of Search ............... 360/85, 95, 93, 83, 360/90; 242/334.6, 419.1, 419.8, 421.8, 421.9, 422.8, 155 R, 156.2, 413.3; 254/272

[56] References Cited

U.S. PATENT DOCUMENTS 4,614,315 9/1986 Gerrits et al. .................. 360/85 X Primary Examiner—John Q. Nguyen
Attorney, Agent, or Firm—Sughrue, Mion, Zinn, Macpeak & Seas

[57] ABSTRACT

A traveling apparatus of a tape recorder uses a tension pole of a tension arm as a rotating shaft, and the tension pole is inserted in an impedance roller to simultaneously control change of tension of a tape, to adjust speed variation of the tape, and to eliminate the noise due to vibration of a tape-reel. By integrating the tension pole and the impedance roller, the number of components required is decreased, the manufacturing process is made simpler, and scaling down the size of products such as a camcorder to be compact and light is made possible.

2 Claims, 2 Drawing Sheets

TAPE RECORDER HAVING INTEGRAL TENSION POLE AND IMPEDANCE ROLLER

BACKGROUND OF THE INVENTION

The present invention relates to a tape recorder, and more particularly, to a traveling apparatus of a tape recorder wherein a tension pole for controlling the tension of a tape which travels toward a drum and an impedance roller for adjusting speed variation and eliminating noise due to vibration are integrally formed therein.

Generally, in video cassette recorders (VCRs), digital audio tapes (DATs), and camcorders, irregular tension, speed variation, and noise caused by the vibration of a tape transferred toward a drum greatly affect the performance of products when recording a signal or playing the recorded signal on the tape. To control or eliminate these problems, several apparatuses are generally required.

As schematically illustrated in FIGS. 1, 2A, and 2B, the traveling system of a conventional tape recorder has a supply reel 12 mounted on a reel base 12 and take-up reel (not shown) for transferring a tape 11 on both sides of the upper portion of a deck 10. A drum 13 for recording a signal or playing the recorded signal on the tape 11 is mounted on the upper center of one side of the deck 10. Loading grooves 14 are formed in both lower sides around the drum 13. A guide roller 15 and a pole base 16 for loading and unloading the tape 11 transferred under the guidance of the loading groove 14 are connected to one end of a loading lever (not shown). The other end of the loading lever is connected to the supply reel 12 and take-up reel.

A tension band 17 having a felt 17a attached thereto is mounted on the outer circumference of the supply reel base, 12 to impose a predetermined braking load during the rotation of the supply reel 12. Both ends of the tension band 17 are respectively fixed to a connecting member 18a and a fixing member 18b of a tension arm 18. Tension arm 18 is spaced apart from the supply reel 12 by a predetermined distance (in FIG. 1, tension arm 18 is disposed to the left of supply reel 12). The tension arm 18 is installed on the upper portion of the deck 10 to be rotatable around a hinge 18c. One end of the tension arm 18 has a tension pole 19 for controlling tension of the tape 11. The other end of tension arm 18 has a spring 20 for elastically biasing the tension arm 18, thereby allowing the tension pole 19 to press the tape 11 in a predetermined direction. On the upper portion of the tension arm 18, an impedance roller 22, inserted with a fixing pin 21, is rotatably mounted on the upper portion of the deck 10. Washers 23 are inserted on the upper and lower ends of the impedance roller 22 to prevent the impedance roller 22 from being separated from the fixing pin 21.

According to the traveling apparatus of the conventional tape recorder as constructed above, when power is supplied to load the tape 11 toward the drum 13, the tape 11 is transferred toward the drum 13. Simultaneously, the guide roller 15 and the pole base 16 contact the inner surface of the tape 11 along the loading groove 14. At the same time, the tension pole 19 contacts the inner surface of the tape 11. Also, the tension arm 18 is rotated around the hinge 18c (to the left, in FIG. 1) by means of the spring 20 connected to one end of the tension arm 18. Here, when the tension of the tape 11 is imposed upon the tension pole 19, the tension of the tape 11 is controlled by the mechanical balance between the spring 20 and the tension band 17 attached with the felt 17a on the outer circumference of the supply reel base 12'.

Here, the noise due to vibration and the speed variation are adjusted. The vibration noise generated from the tape-reel is eliminated by the impedance roller 22 rotatably inserted with the fixing pin 21 provided on the upper direction of the tension arm 18. The speed variation is adjusted either by weighting the impedance roller 22 or by enlarging the radius of the impedance roller 22.

However, in the above-described traveling apparatus of the tape recorder, since the tension-controlling apparatus and the impedance roller are respectively installed on the deck to control change of tension of the tape, adjust tape speed, and eliminate the noise due to vibration produced from the tape-reel, the number of components is increased and the quadrature with regard to the deck is difficult to be adjusted. Therefore, the manufacturing process is complicated, and especially, space on the deck is not easily secured, so that it becomes difficult to scale down the VCR and camcorder to be compact and light.

SUMMARY OF THE INVENTION

The present invention is devised to solve the above-described problems. It is an object of the present invention to provide a traveling apparatus of a tape recorder wherein a tension pole of a tension arm and an impedance roller mounted on a deck are integrally formed as one body to simultaneously control change of tension, adjust tape speed, and eliminate the noise caused by vibration generated from a tape-reel, as well as reduce the size of products such as camcorders.

To achieve the above object of the present invention, there is provided a traveling apparatus of a tape recorder for controlling change of tension in a tape transferred along a predetermined travel-path on a deck thereof, adjusting speed variation of the tape, and eliminating the noise caused by vibration of a tape-reel, wherein a tension pole of a tension arm installed on the upper portion of the deck is integrally formed with an impedance roller, thereby being capable of simultaneously controlling change of tension of the tape, adjusting speed variation of the tape, and eliminating the noise caused by vibration.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Figure 1:
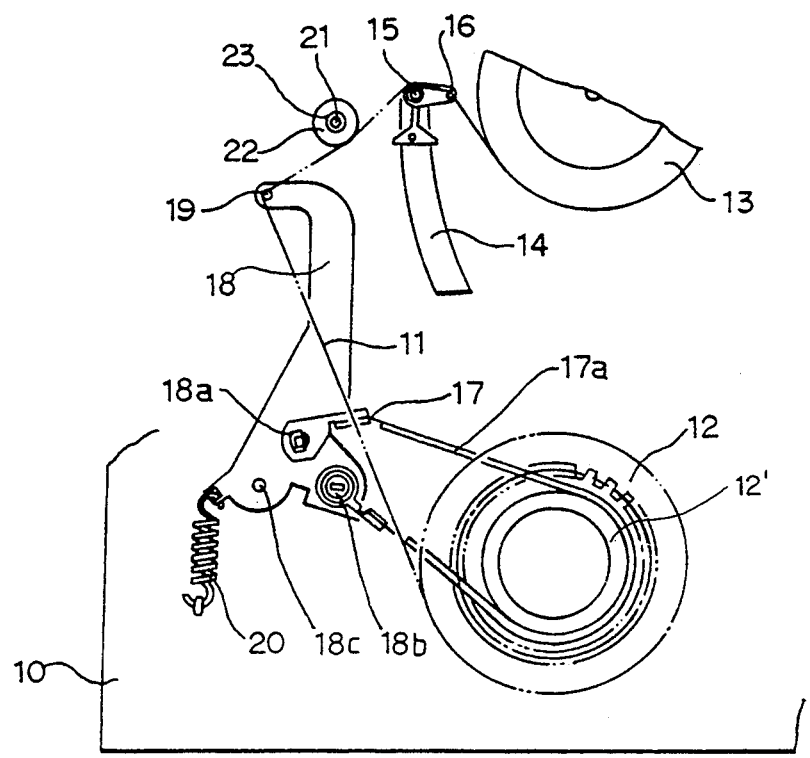
FIG. 1 is a plan view showing a traveling system of a conventional tape recorder.
Figure 2A:
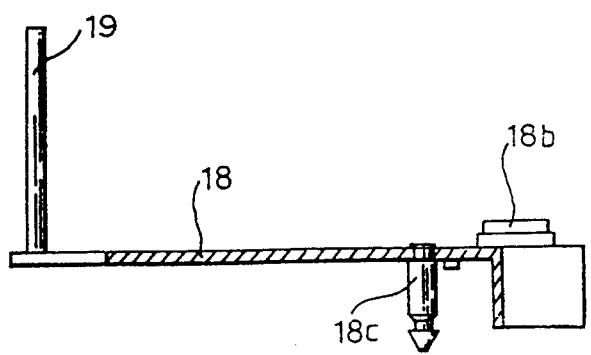
FIGS. 2A and 2B are sectional views showing the tension-controlling apparatus and the impedance roller of the conventional tape recorder, respectively.
Figure 2B:
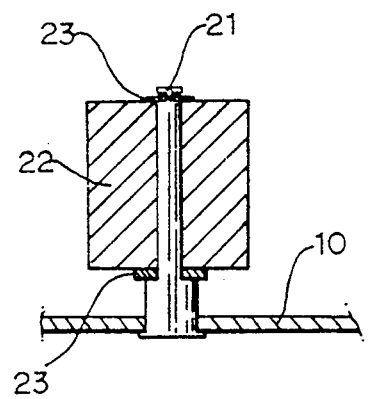
Figure 3A:
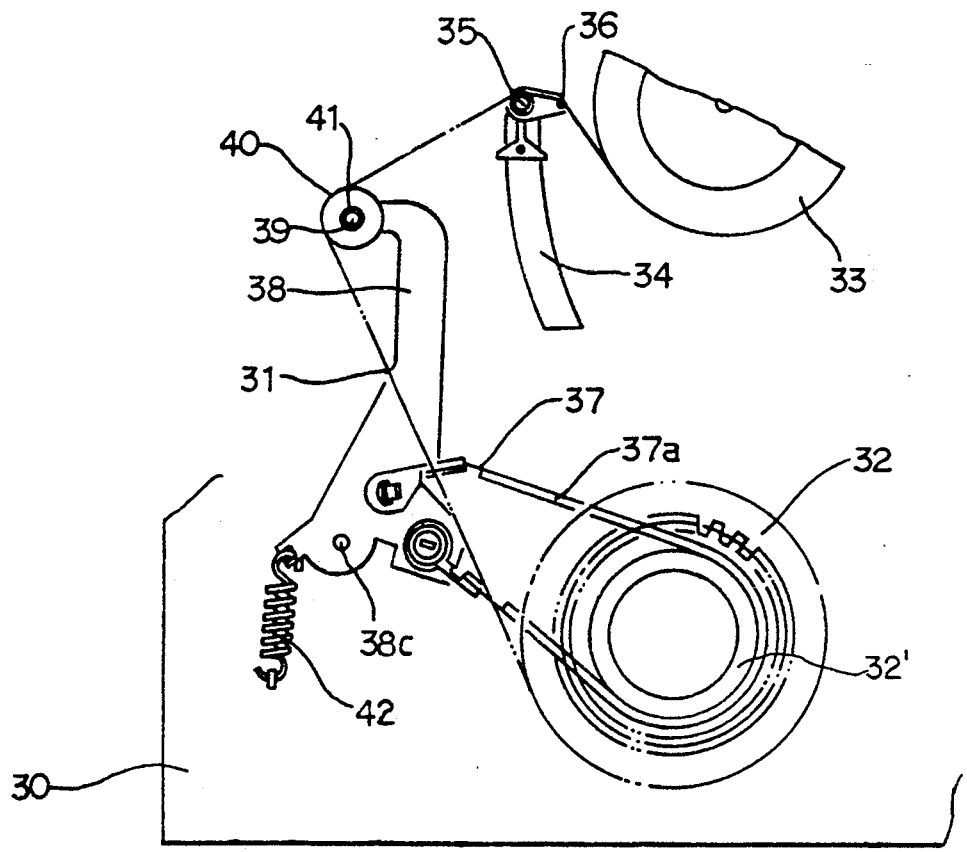
FIG. 3A is a plan view schematically showing a traveling system of a tape recorder according to the present invention.
Figure 3B:
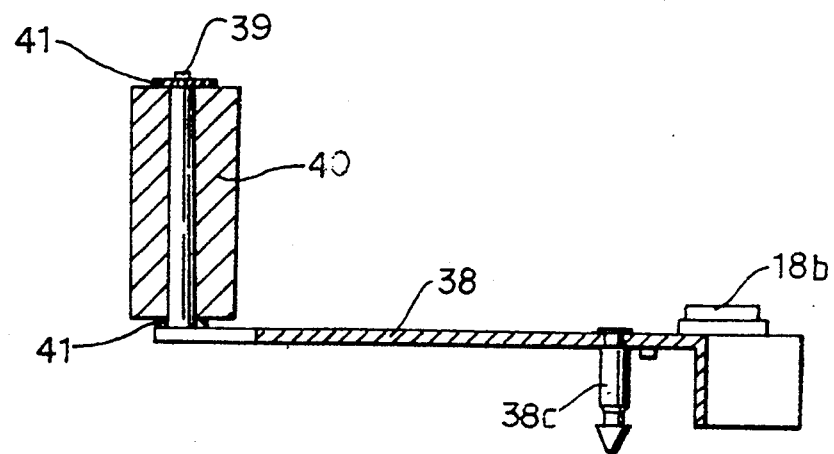
FIG. 3B is a sectional view showing the tension-controlling apparatus integrally formed with the impedance roller of the traveling system of the tape recorder according to the present invention.

FIGS. 3A and 3B illustrate the traveling apparatus of the tape recorder according to the present invention, wherein a supply reel 32 mounted on a reel base 32' and a take-up reel (not shown) are formed on the upper portion of a deck 30 for transferring a cassette tape 31. A drum 33 for recording a signal or playing a recorded signal on the tape 31 is mounted on the upper center of the deck 30.

Loading grooves 34 are formed in both lower sides of the drum 33. A guide roller 35 and a pole base 36 for loading and unloading the tape 31 transferred under the guidance of the loading groove 14 are connected to one end of a loading lever (not shown). The other end of the loading lever is connected to the supply reel 32 and take-up reel. A tension arm 38 is installed a predetermined distance away from the supply reel 32 (in FIG. 3A, tension arm 38 is disposed to the left of supply reel 32). Tension arm 38 is rotatable around a hinge 38c. One end of the tension arm 38 has a tension pole 39 inserted with a rotatably-mounted impedance roller 40 which employs the tension pole 39 as a rotating shaft. The combination impedance roller/tension pole simultaneously controls the change of tension of the tape 31, adjusts speed variation of the tape 31, and eliminates the noise caused by vibration generated from the tape-reel. The upper and lower ends of the impedance roller 40 inserted with the tension pole 39 are secured with washers 41 to prevent separation from the tension pole 39 which is the rotating shaft.

According to the traveling apparatus of the tape recorder as constructed above, when power is supplied to load the tape 31 to record a signal on the tape 31 seated on the supply reel 32 and take-up reel or play the recorded signal, the tape 31 is transferred toward the drum 33. Simultaneously, the inner surface of tape 31 contacts the guide roller 35 and the pole base 36 along the loading groove 34. In addition, the impedance roller 40 inserted with the tension pole 39 contacts the inner surface of the tape 31, and the tension arm 38 rotates around the hinge 38c (to the left, in FIG. 3A) by means of a spring 42 attached on one end thereof.

At this time, if the tension of the tape 31 contacting the outer circumference of the impedance roller 40 becomes great, the spring 42 mounted on one end of the tension arm 38 is greatly displaced in a moment. Consequently, the holding force of the tension band 37 mounted on the supply reel base, 32 becomes weak, so that the supply reel 32 is rotated smoothly, and the tension of the tape 31 returns to its initial state by means of the spring 42.

Conversely, if the tension of the tape 31 is weak, the displacement of the spring 42 is decreased while the holding force of the tension band 37 is increased, thereby rotating the supply reel 32 smoothly.

On the other hand, when the forward speed of tape 31 is minutely changed and the tape 31 contacts the impedance roller 40 having a great inertial force, the speed variation of the tape 31 is inhibited by frictional force, and the noise caused by vibration of the tape-reel is eliminated by the inertial moment of the impedance roller 40.

In the present invention as described above, the tension pole of the tension arm is integrally formed with the impedance roller to be capable of simultaneously controlling change of tension of the tape, adjusting speed variation of the tape, and eliminating the noise due to vibration. Furthermore, the number of components is reduced and products such as camcorders can be scaled down to be compact and light.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A traveling apparatus of a tape recorder for controlling change of tension of a tape transferred from a tape reel mounted on a reel base along a predetermined travel-path an a deck thereof, adjusting speed variation of said tape, and eliminating noise caused by vibration of a tape-reel, comprising: a tension arm pivotally mounted on an upper portion of said deck and having at one end a tension band wrapped around said reel base for applying a braking load to the reel base in accordance with the pivotal movement of the tension arm, a tension pole mounted at a second end of said tension arm, an impedance roller rotatably mounted on said tension pole for contacting said tape being supplied from said tape reel, said tension arm being resiliently biased to rotate in a direction to engage said roller against said tape and to increase the braking load such that an increase in tension in said tape results in a pivotal movement of said tension arm in an opposite direction to decrease said braking load.

2. A traveling apparatus of a tape recorder as claimed in claim 1, wherein washers are fixed on upper and lower ends of said tension pole at respective ends of said impedance roller to prevent said impedance roller from coming off of said tension pole during high-speed rotation of said impedance roller.

* * * * *